Figure 1:
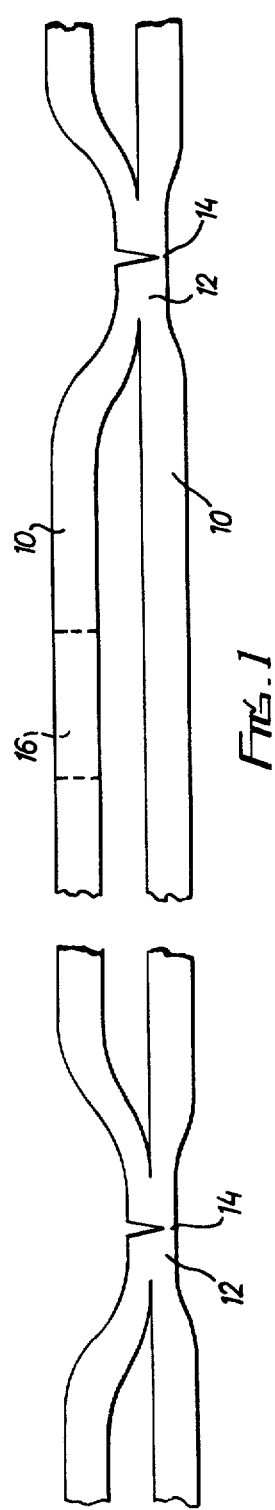

United States Patent [19]

Hutcheon et al.

[11] 4,242,385

[45] Dec. 30, 1980

[54] ENDLESS BANDS

[75] Inventors: Keith F. Hutcheon, Beeston;
Laurence A. Cordingley, Lenton,
both of England

[73] Assignee: TI Raleigh Industries Limited,
Nottingham, England

[21] Appl. No.: 840,364

[22] Filed: Oct. 7, 1977

[30] Foreign Application Priority Data

Oct. 9, 1976 [GB] United Kingdom ............ 42074/76

[51] Int. Cl.³ ...................... B60R 13/00; B32B 27/14
[52] U.S. Cl. .................................... 428/31; 156/158;
156/273; 301/37 R; 301/37 H; 428/131;
428/198; 428/332
[58] Field of Search ............... 428/148, 131, 332, 31;
156/158, 273; 301/37 R, 37 H

[56] References Cited

U.S. PATENT DOCUMENTS 4,143,195  3/1979  Rasmussen ..................... 428/198 X

FOREIGN PATENT DOCUMENTS 638034   5/1950  United Kingdom .
735614   8/1955  United Kingdom .
882740  11/1961  United Kingdom .
884077  12/1961  United Kingdom .
885730  12/1961  United Kingdom .
887292   1/1962  United Kingdom .

Primary Examiner—Thomas J. Herbert, Jr.
Attorney, Agent, or Firm—Fleit & Jacobson

[57] ABSTRACT

There is disclosed a method of making an endless band, or a plurality of separably connected endless bands, from flexible weldable material especially plastics material. The method involves, basically, joining together two superimposed like strips of such material by welding together each pair of corresponding ends. Large quantities of such bands, separably connected together, can be continuously produced by feeding two batches of strip material forward in superimposed relationship, welding them together at intervals, and forming a tear-seal connection at the weld. Endless bands so formed are disclosed.

6 Claims, 2 Drawing Figures

U.S. Patent

Dec. 30, 1980

4,242,385

ENDLESS BANDS

This invention concerns endless bands of flexible weldable material, for example, and particularly, rim tapes of plastics material for bicycle wheels.

Rim tapes for bicycle wheels are conventionally made from extruded or slit tape of plastics material by cutting off the length required, bringing the two ends together and joining them with a lap or butt weld. A hole is punched in the tape to accommodate the valve of the inner tube.

These operations are difficult to perform with an automatic machine and the main object of the invention is to provide a method of making such rim tapes which is suitable for a high speed automatic manufacturing process.

According to the present invention a method of making an endless band of flexible weldable material, especially a plastics material includes the step of connecting two superimposed strips of such material by means of two welds respectively joining each of the pairs of corresponding ends of the two strips together.

Also according to the present invention there is provided a method of continuously producing interconnected separable endless bands of flexible weldable material, especially a plastics material, in which two batches of strip material are fed, continuously or intermittently, in superimposed relationship, to welding means, and said welding means operated to form a weld joining the two batches of strip material together at appropriate spaced intervals.

These methods may be practised in combination with the following optional features, as appropriate, namely:

(a) the material of each batch consists of a plurality of side-by-side strips and the welds are such as to result in a corresponding number of series of longitudinally interconnected pairs of superimposed welded strips;
(b) the welds are also such as to connect said series together transversely;
(c) the welding means is a pinch welder;
(d) a tear-seal connexion is formed between longitudinally successive pairs of strips simultaneously with the welding operation;
(e) when the or each band is intended for use as a rim tape for a bicycle wheel, a single hole, to accommodate the valve of an inner tube, is formed in the strip material between the two welds or successive welds as the case may be;
(f) when the or each band is intended for use as a rim tape for a bicycle wheel, there is formed, at one weld region or each weld region as the case may be, complementary identical apertures in each components of strip material which together form a single hole to accommodate the valve of an inner tube.

Also according to the present invention an endless band of flexible weldable material, especially plastics material, comprises two superimposed strips of such material joined by welding at each pair of corresponding ends thereof.

Furthermore the present invention includes a plurality of such endless bands separably connected together end-to-end by successive welded regions. A tear-seal connexion may be formed centrally and transversely of each welded region. Also such a plurality of endless bands may be side-by-side with at least one like plurality of endless bands and separably connected thereto by corresponding adjacent welded regions. The or each band may have a hole formed therein, for example to accommodate an inner tube valve, when the band is intended to be used as a rim tape for a bicycle wheel.

Figure 2:
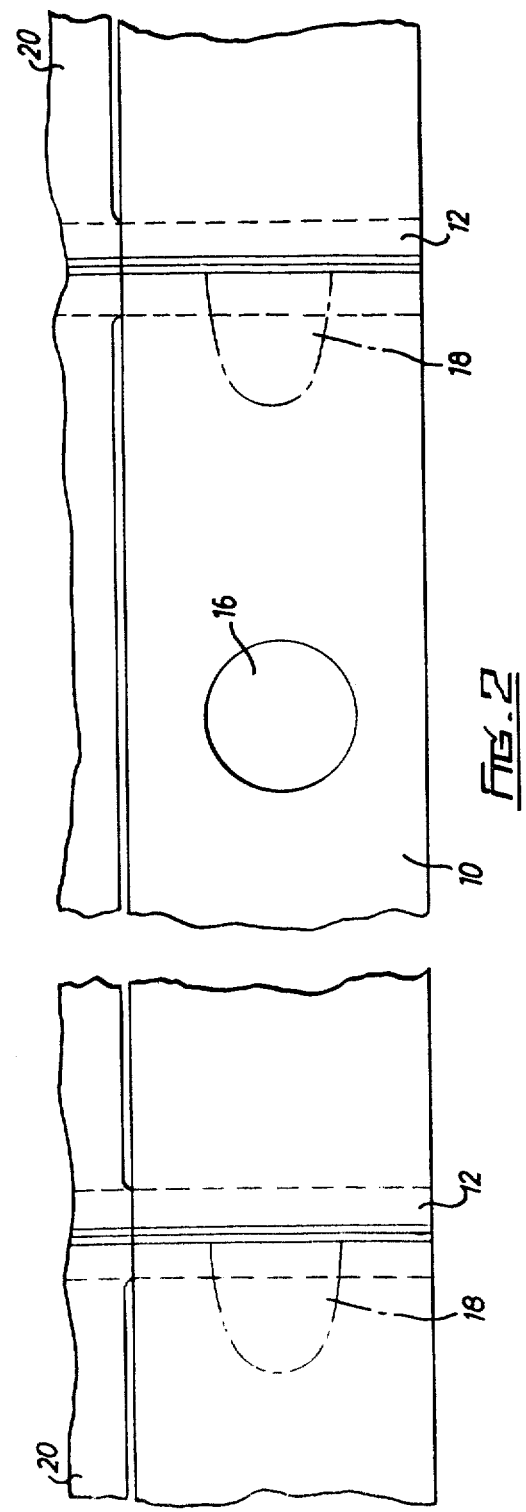

The invention will now be described further, by way of example only, with reference to the accompanying drawings, in which:

FIG. 1 is a side elevation of part of a length of material produced according to the invention from which single rim tapes for bicycle wheels may be readily separated as required; and FIG. 2 is a plan view corresponding to FIG. 1.

In a simple commercial process incorporating the method according to the invention two reels of strip material (hereinafter called "tape") made from a suitable plastics material such as polyvinyl chloride are provided. Tapes 10, one from each reel, are laid together and simultaneously fed to a pinch welder which joins them together by transverse welds 12 the central region 14 of each of which is almost severed. This is a known technique in the plastic bag art and such a welded region is known as a "tear-seal". The distance between successive welds 12 is equal to half the circumference of the particular size of rim tape required. The tapes also pass through a punching device which makes a hole 16 in one of the superimposed tapes in the interval between each successive pair of welds; or which makes apertures 18 in both tapes in and adjacent each weld 12. In the latter case the two apertures 18 will eventually form a single hole as will later be obvious. The purpose of the punching operation is to accommodate the inner tube valve. In order to achieve greater productivity further tapes 20 may be fed forward with tapes 10 so that two or more pairs of tapes move simultaneously for welding and punching at the appropriate intervals. The welds may also serve to connect the adjacent pairs of tapes together, as shown, in a readily separable manner.

The welding and punching processes are repeated continuously, so that long lengths of rim tapes joined together by tear-seals are manufactured. They are readily separated and opened out, each tape then comprising a circular loop with two welded joints diametrically opposed.

The rim tapes may be left attached to each other and spooled until required for use, or they may be automatically separated after welding by a haul-off mechanism.

If extruded tape with a non-uniform cross section is employed, the two tapes must be laid face to face or back to back before welding.

Each weld will create a small projection since it is formed entirely on one side of the loop but this will be no greater than the size of a spoke nipple head and can be arranged to be placed on the inside by turning the loop inside out.

The tape feed to the welder and the punching device can be intermittent, the welding and punching taking place when the tapes are stationary. Alternatively the welder and punching device may be mounted on a flying mechanism which operates so that the travel of the tapes need not be interrupted. In the lattercase the process can conveniently involve direct feeding from one or more extruders which produce the requisite number of tapes simultaneously.

We claim:

1. An endless rim tape band for a bicycle wheel comprising two superimposed strips of flexible plastics material each having a length substantially equal to half the circumference of the wheel and wherein the length of each of said strips is substantially greater than the width of said strips, said strips welded to each other at respective ends of the strips along a weld line transverse to the length of the strips, and means defining a hole in at least one of the strips for accommodating a valve associated with the bicycle wheel.

2. An endless band as claimed in claim 1, wherein the width of said strips is not greater than the width of the bicycle wheel rim.

3. A plurality of endless bands of flexible, weldable, plastics material, each endless band as claimed in claim 1, comprising tear-seal welding means for interconnecting the plurality of endless bands at respective ends of the strips along the width of the strips.

4. A bicycle wheel rim tape in the form of an endless band comprising two superimposed strips of flexible plastics material each having a length substantially greater than its width, said strips having a welded connection to each other at respective ends of the strips to form said endless band, said welded connections extending along weld lines substantially transverse to the length of the strips and means defining a hole in at least one of the strips for accommodating a valve associated with a bicycle wheel.

5. The rim tape as defined in claim 4 wherein said hole defining means comprises means defining aligning openings in each of said strips, each of said openings intersecting one of said weld lines.

6. The rim tape as defined in claim 4 or claim 5 wherein said strips are strips of polyvinyl chloride material.

* * * * *